(12) United States Patent
Rupert et al.

(10) Patent No.: US 7,588,493 B2
(45) Date of Patent: *Sep. 15, 2009

(54) METHODS AND APPARATUS FOR ANALYZING A GAME SITUATION USING POSITIONAL INFORMATION IN A GAME SPACE

(75) Inventors: Jason Rupert, Port Coquitlam (CA); Geoffrey Harrower, Burnaby (CA)

(73) Assignee: Electronic Arts, Inc., Redwood City, CA (US)

( * ) Notice: Subject to any disclaimer, the term of this patent is extended or adjusted under 35 U.S.C. 154(b) by 755 days.

This patent is subject to a terminal disclaimer.

(21) Appl. No.: 10/491,585

(22) PCT Filed: Oct. 22, 2002

(86) PCT No.: PCT/US02/33969

§ 371 (c)(1),
(2), (4) Date: Oct. 12, 2004

(87) PCT Pub. No.: WO03/037464

PCT Pub. Date: May 8, 2003

(65) Prior Publication Data

US 2005/0037826 A1  Feb. 17, 2005

(51) Int. Cl.
*A63F 9/24* (2006.01)

(52) U.S. Cl. .......................................... 463/4; 345/441

(58) Field of Classification Search ............... 463/1–5, 463/30–34; 345/419–420, 423–424, 427, 345/441–443
See application file for complete search history.

(56) References Cited

U.S. PATENT DOCUMENTS

| | | | |
|---|---|---|---|
| 6,168,519 B1 * | 1/2001 | Nakagawa et al. | ............. 463/4 |
| 6,340,332 B1 | 1/2002 | Rimoto et al. | |
| 6,384,826 B1 | 5/2002 | Bern et al. | |
| 6,392,647 B1 | 5/2002 | Migdal et al. | |
| 2004/0259616 A1 | 12/2004 | Hirai | |

* cited by examiner

*Primary Examiner*—Peter DungBa Vo
*Assistant Examiner*—Jasson H Yoo
(74) *Attorney, Agent, or Firm*—Philip H. Albert; Townsend and Townsend and Crew LLP

(57) ABSTRACT

In a computer game, a game situation is analyzed using states of a plurality of game elements by determining a state for each of the plurality of game elements (10), generating a representation of a Voronoi diagram among the game elements using at least some of the game elements (10) as Voronoi sites and performing an analysis of the game situation using the Voronoi diagram (16). The analysis can be spatial analysis and/or tactical analysis to determine a move of a computer controlled entity based on the tactical analysis. The game space might represent playing spaces for soccer, baseball or basketball. The state of a game element might include momentum, speed, and direction of travel (14), velocity and/or team association of the game element. For a soccer game analysis, multiple Voronoi diagrams might be generated and the analyses done using the multiple Voronoi diagrams.

99 Claims, 9 Drawing Sheets

METHODS AND APPARATUS FOR ANALYZING A GAME SITUATION USING POSITIONAL INFORMATION IN A GAME SPACE

FIELD OF THE INVENTION

The present invention relates to computer games in general and more particularly to analyzing game situations and displaying analysis results in graphical forms in a computer game.

BACKGROUND OF THE INVENTION

A typical competitive computer game involves a human opponent and a computer opponent. Such competitive computer games include chess, auto racing, fantasy games, and sports games. For a game to retain the interest of the human opponent, it should be a good enough opponent that the human opponent does not win every time. Thus, there is an element of analysis required in all but the simplest competitive computer games. This analysis is done on a current game situation and might be used by the computer game to determine a next move of the computer opponent.

For example, where the game is chess, the computer game is programmed to analyze a game situation, namely the current location of the chess pieces on the chess board and possibly also the history of moves made by the human opponent, and then make a decision as to what move to make in response to that game situation. The rules of chess constrain the analysis and responses and the computer need only decide, for each move, which of sixteen or fewer pieces to move to one of a few dozen spaces in a board constrained to only 64 distinct locations. Therefore, determining all of the possible moves is a simple matter. Of course, computer opponents in chess are difficult to program, but that is because moves must be anticipated many moves into the future.

With racing games, the computer-operated racecar or object just needs to be moved along a track quickly. With fantasy games, the possible actions can be arbitrary. Sports games and other competitive games that simulate real-world activities in a realistic way are more difficult in part because the field is not a small discrete set of positions and the game must behave as the human opponent would expect in the corresponding real-world activity.

As one example, the game of soccer involves several players and a ball that are free to move anywhere in a continuous two-dimensional space (possibly a three-dimensional space if player jumps and ball height are taken into account). Soccer strategy involves many considerations, such as trying to position players so that one player can kick the ball to a teammate without interference from a player on the opposing team. In order for a computerized soccer game played between a human opponent and a computer opponent to be interesting, the computer opponent must present a challenge to the human opponent and therefore, the computer game must perform in depth analysis of the game situation and determine how to move and manipulate the computer opponent team members to present that challenge. Preferably, the computer analysis is efficient enough that, given some limited amount of computing power available to the computer game, the game can analyze a game situation and fashion a suitable response in real-time.

BRIEF SUMMARY OF THE INVENTION

In a computer game, one embodiment of the present invention provides for analyzing a game situation using states of a plurality of game elements by determining a state for each of the plurality of game elements, generating a representation of a Voronoi diagram among the game elements using at least some of the game elements as Voronoi sites and performing an analysis of the game situation using the Voronoi diagram. The analysis is a spatial analysis that might be used as the basis of a tactical analysis to determine a move of a computer-controlled entity. In a specific embodiment, the game space is a two-dimensional soccer field and the game elements are players having associated teams. The game space might be a three-dimensional game space. The game space might represent a baseball field, a basketball court or other game space besides a soccer field.

The state of a game element might include momentum, speed, direction of travel, velocity and/or team association of the game element. The analysis for a soccer field might include determining passing lanes between players of the computer-controlled team. For a soccer game analysis, multiple Voronoi diagrams might be generated, such as Voronoi diagrams for each team's players without the goalies, diagrams for each team's players with the goalies and diagrams for combinations of two teams' players with and without goalies and the analyses done using the multiple Voronoi diagrams.

Other features and advantages of the invention will be apparent in view of the following detailed description and preferred embodiments.

BRIEF DESCRIPTION OF THE DRAWINGS

FIG. 5 illustrates various Voronoi diagrams usable for analysis.

DETAILED DESCRIPTION OF THE INVENTION

Embodiments of the invention are described here, with reference to the figures. Where elements of the figures are called out with reference numbers, it should be understood that like reference numbers refer to like elements and might or might not be the same instance of the element.

Throughout this disclosure, reference is made to Voronoi diagrams. Given a set of points designated as "Voronoi sites"

in a space, that space can be divided up into a collection of regions ("Voronoi cells") such that each Voronoi site has an associated Voronoi cell and each of the points in the associated Voronoi cell are closer to the cell's site than any other site. As used herein, "Voronoi division" is the term used to refer to the process of dividing up a space into Voronoi cells and a Voronoi diagram is an indication of those Voronoi cells.

It should be understood that there are many ways of representing the same information that represents the Voronoi diagram. Where the space is not bounded by curves, each cell can be described by the positions of a finite number of vertices of the cell. Thus, the generation of a representation of a Voronoi diagram should not be construed as being limited to generating a display of such a diagram, but might cover any manner of generating the information about the bounds of the cells.

Some definitions of Voronoi diagrams are defined as divisions of a plane, but it should be understood that herein, the definition is not so limited, as the methods and apparatus described herein could be used for dividing three- (or N-) dimensional spaces, which could be convex, concave, infinite, curved, polygonal, or some combination of those characteristics. The Voronoi sites can be points or they can be polygonal or other dimensional objects.

Voronoi diagrams are well known in the mathematical arts and many computational methods are in use for generating Voronoi diagrams from a set of sites, so the details of the definitions and conventional methods and apparatus for generation of Voronoi diagrams need not be presented here. Conventional methods can be used, but in some instances, higher performance is needed, in which case some or all of the computational variations for performing Voronoi division described herein might be used.

Figure 1:
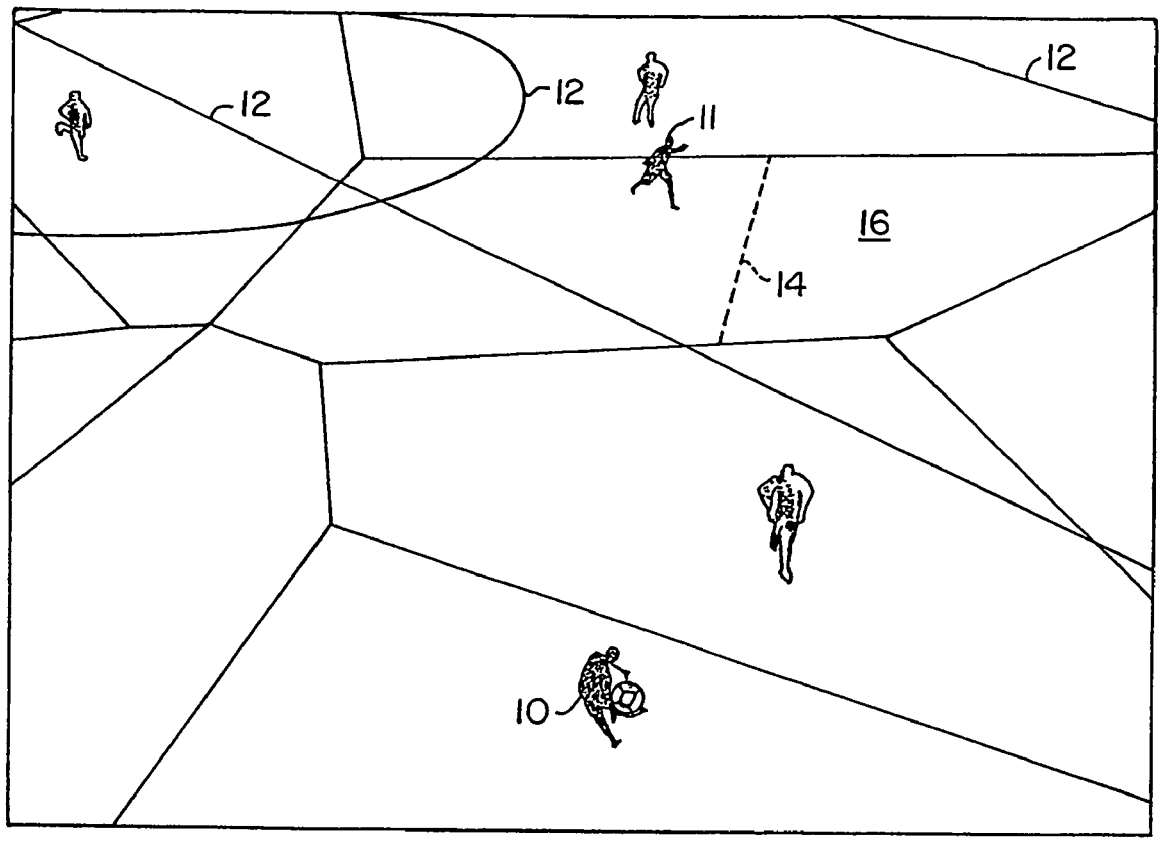
FIG. 1 is an illustration of a portion of a soccer field with a Voronoi diagram overlaid thereon, usable for analysis according to aspects of the present invention.

FIG. 1 is a perspective view of a portion of a representation of a soccer field, with a Voronoi diagram overlaid thereon. Here, the Voronoi space is a soccer field (in two-dimensions) and the Voronoi sites are coincident with player positions for players from one of the teams (including the goalie for that team). FIG. 1 is presented to illuminate the following description of apparatus and methods for generating such diagrams and using them for analysis in a computer game. In the view of FIG. 1, two players with darker team colors and three players with lighter team colors are illustrated. One of the darker team players is a current ball holder 10, while the other is a potential pass recipient 11. Lines 12 are lines of the soccer field, included here to indicate relative field positions and represent a soccer field. The other lines in the figure represent divisions between Voronoi cells and represent a Voronoi diagram.

As explained herein, one analysis that uses the Voronoi diagram, edges or vertices is an analysis of how to pass the ball without opponents being able to intercept the pass. As an example, the target for the ball might be along a line segment 14 that divides the Voronoi cell 16 of player 11. Because of the Voronoi division, it is known that all of the points on line segment 14 are closer to player 11 than to any other player and such knowledge is obtained without having to test or sample many candidate points.

Figure 2:
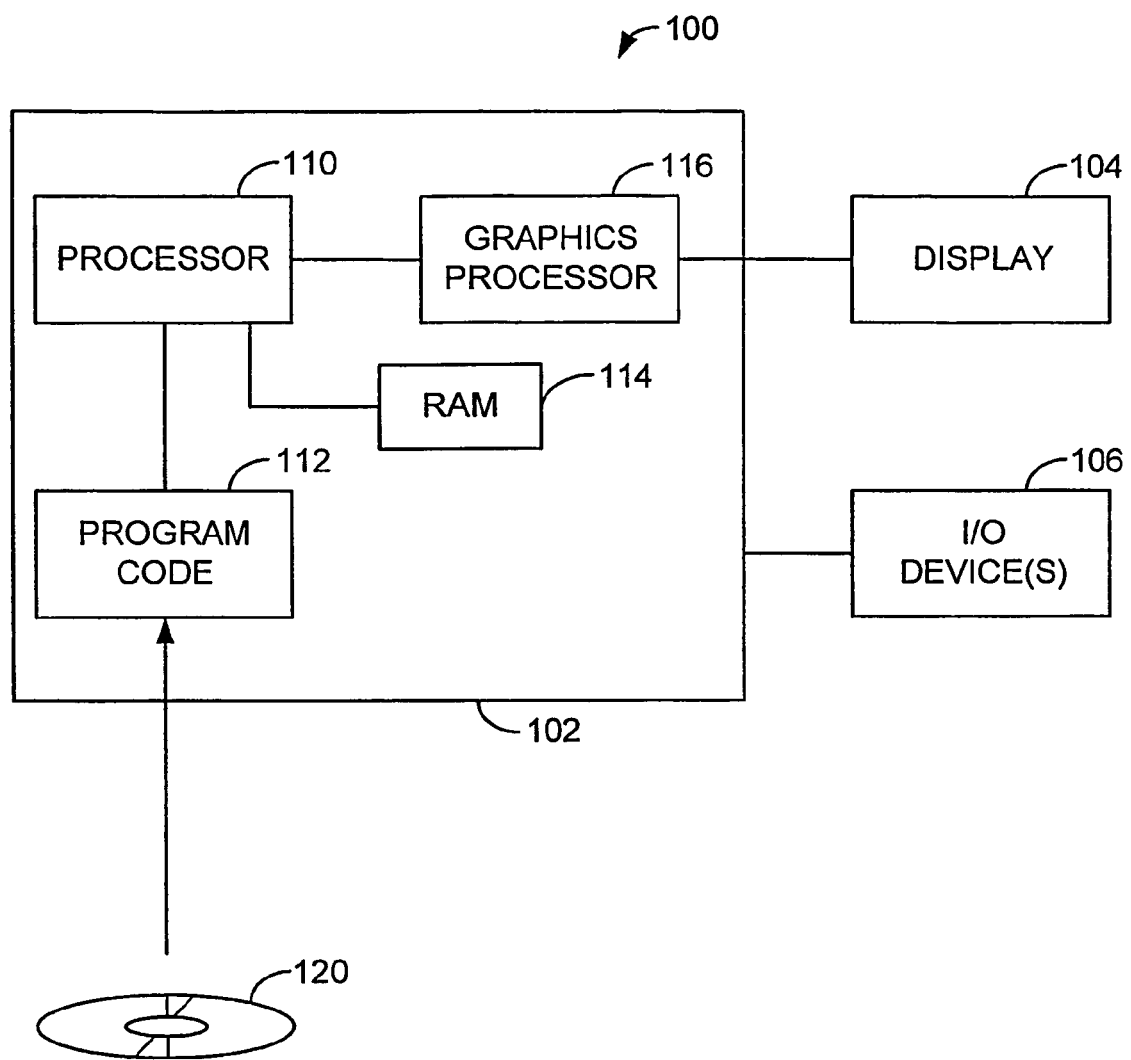
FIG. 2 is a block diagram of a computer game hardware system in which the present invention might be implemented.

FIG. 2 is a block diagram of a simple computer game hardware system 100 in which the present invention might be implemented. System 100 is shown comprising a console 102 coupled to a display 104 and input/output (I/O) devices 106 usable for interacting with a game user. Console 102 is shown comprising a processor 110, program code storage 112, temporary data storage 114 and a graphics processor 116.

Program code storage 112 might be ROM (read only memory), RAM (random access memory), hard disk, other magnetic storage, optical storage, other storage or a combination or variation of these. In a common arrangement, part of the program code is stored in ROM that is programmable (ROM, PROM, EPROM, EEPROM, etc.) and part of the program code is stored on removable media such as CD-ROM 120 (as shown) or might be stored on a cartridge, memory chip or the like, or obtained over a network or other electronic channel as needed.

Temporary data storage 114 is usable to store variables and other game and processor data as needed. Typically, temporary data storage 114 is RAM and holds data that is generated during the play of the game, such as the status of each player (position, direction, etc.) and data generated for analysis such as the results of a Voronoi division.

Figure 3:
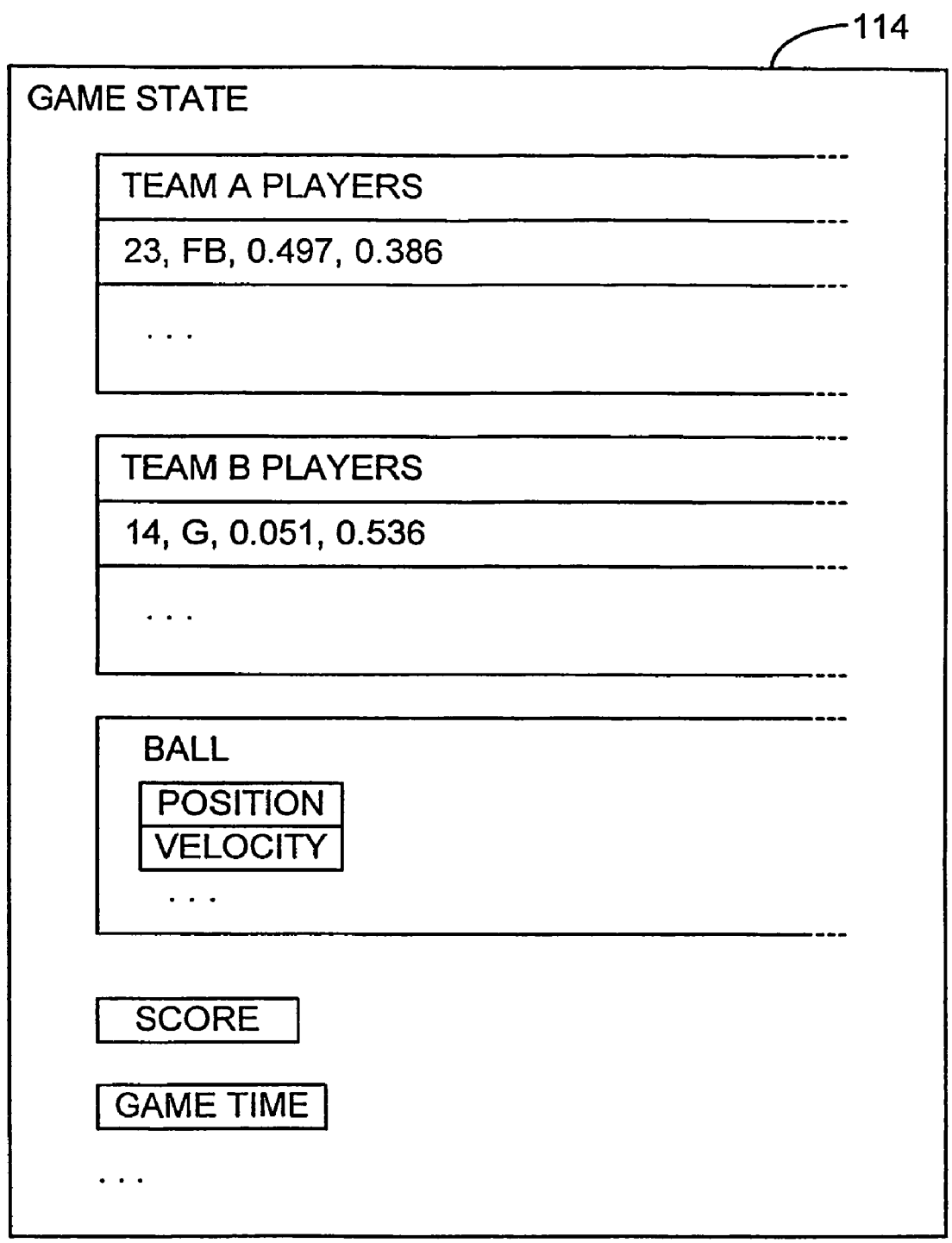
FIG. 3 illustrates an example of a data structure for game state.

FIG. 3 illustrates an example of a data structure for game state that might be stored in temporary data storage 114 as a game is being played. As shown there, the game state structure is divided into a first team structure and a second team structure and each team structure is divided into player structures. Each player structure is shown with data associated with one player. In the example shown in the figure, the first player structure for team "A" holds player data representing the player's number (23), player position (FB—fullback), location on the field (0.497, 0.386), etc. As shown, the game structure also contains structures for ball position, ball velocity, current score, game time, etc.

It should be understood that FIGS. 2-3 show an example of a computer game system that might use the inventive methods and apparatus and the invention is not limited to that example. Thus, the invention might be used with a hardware arrangement other than that shown in FIG. 2 and with data structures other than those shown in FIG. 3.

Figure 4:
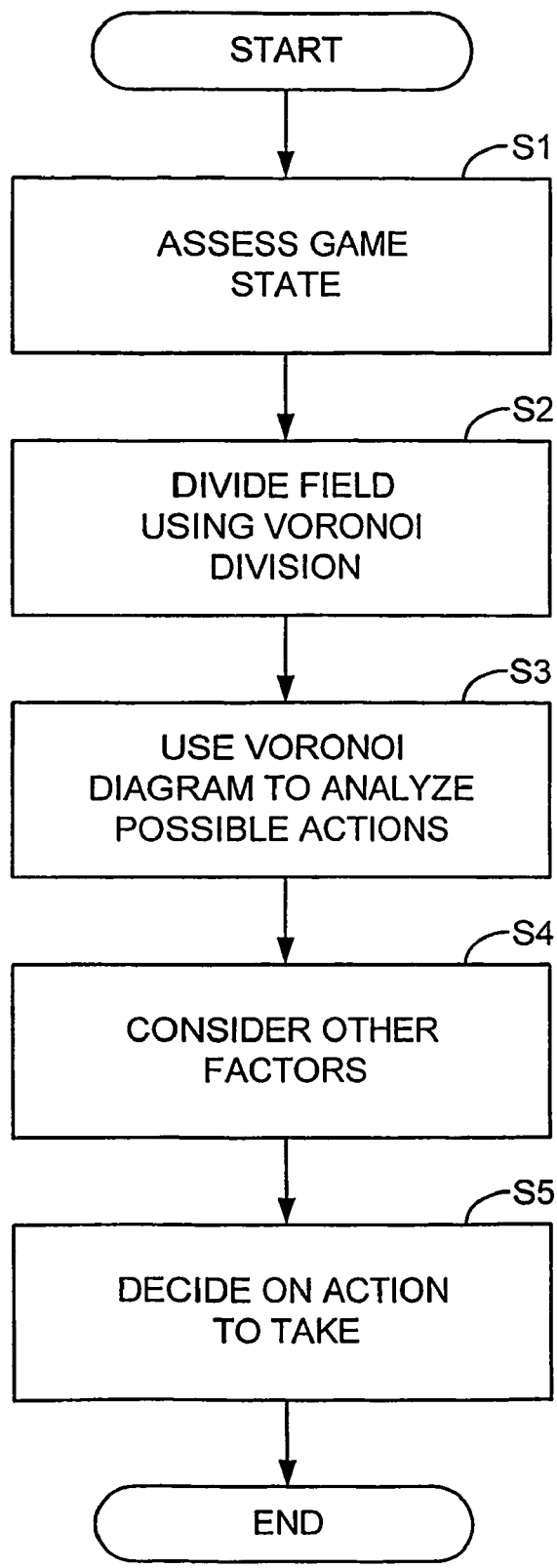
FIG. 4 illustrates a process for determining a next move for a player.

FIG. 4 illustrates a process for determining a next move for a player, usually a computer-controlled team player. Typically, this process is initiated by a higher level operation in the game sequence and the results of the process illustrated in the figure are used by the higher level operation. For example, the higher level operation might be a main program that runs the game and interactions with the user and the process in FIG. 4 is a subroutine that is called when the main program needs to make a move. It should be understood that the "next move" as determined by a tactical analysis process can be a discrete move, as is common in chess and other games, or it can be a less discretely defined move such as a movement or urging of a game element generally toward a game space location. The analysis might be used solely for determining a next move in isolation or for determining a next sequence of moves or strategies.

The illustrated method begins with an assessment of a game state (step 1). This might include determining where each relevant player is, their momentum, the position of the ball, the game time, etc. Once the game state is assessed, the field is divided into Voronoi cells (step 2). As explained herein, the cells might be defined as the collections of points closest to their respective sites located at player locations. However, in some embodiments, the metric is not always a uniform, linear distance metric but might be a weighted and/or nonlinear metric of distance and/or other variables.

The game state is typically an instantaneous state, i.e., it changes over time. Therefore, the resulting Voronoi division may also change over time. Of course, the game state could be other than an instantaneous snapshot and might take into account recent game events as well as a state at a current instant of time. The frequency of recalculation of a Voronoi division to keep up to date might vary as needed to account for levels of game play (more sophisticated processes might require faster updates) and processing power (slower machines might make so with less frequent updates). In some implementations, the rate of recalculation is synchronized with a game window update rate.

Once the field is divided, the resulting Voronoi diagram is used to analyze possible actions (step S3). Actions include where to move the player, where to move the ball, where and when to pass, etc. The diagram might also be used to determine multiplayer actions, such as how to move a receiver and a passer prior to passing the ball from the passer to receiver, or when and how to move a goalie to prevent a shot on goal. It should be understood that an actual Voronoi diagram need not actually be generated and a tactical engine or other computer element performing an analysis need only have a representation of the results of the Voronoi division, such as indications of Voronoi vertices, edges and/or the like. Where actions include headers, crosses, corner kicks and the like, the third dimension (height) might be taken into account.

Once the possible actions are determined in step S3, then other factors can be considered (step S4), such as taking into account constraints imposed by rule, such as the offsides and out-of-bounds rules. For example, if an analysis determines that a potential receiver is in fact out-of-bounds or offsides, the analysis might be adjusted to not cause a pass to that person. Once the other factors are taken into account, the tactical engine decides on the action to take (step S5).

The step of doing the Voronoi division (step S2) might be a step of generating one Voronoi diagram (or representation thereof), but it might also be a step of generating more than one Voronoi diagram, each for a different set of sites. Specifically, one Voronoi diagram uses the position of soccer players on a soccer field as the sites, and the analysis in step S3 combines the results of step S2 (the division) with other geometric properties of the soccer game to compute tactical options for computer and human controlled players. Examples of other geometric properties include objective properties such as a current position of an offside line, half line or penalty area (useful as it defines where the goalie can use his or her hands and where defensive fouls result in penalty shots). The geometric property might also include subjective properties assigned to regions of the game space, such as "the flank" defined either as a clearly bordered region or regions or as an area having a gradual transition from points inside the flank to points outside the flank. Other subjective properties might include "shooting regions". In addition to objective and subjective properties, the analysis might also include derived properties such as the anticipated heading of a player.

The combination is useful for calculating a wide variety of tactical information, such as determining where offensive and defensive players should position themselves on the field, determining when and where a player should make an offensive run, determining when and where a player should dribble the ball, determining when and where a player should pass the ball, determining tactical pattern matching, determining defensive marking logic, determining collision avoidance/ detection and/or determining tactical on-screen indicators. Details of how the tactical information is determined, such as where to place a player, are described further below.

Figure 5A:
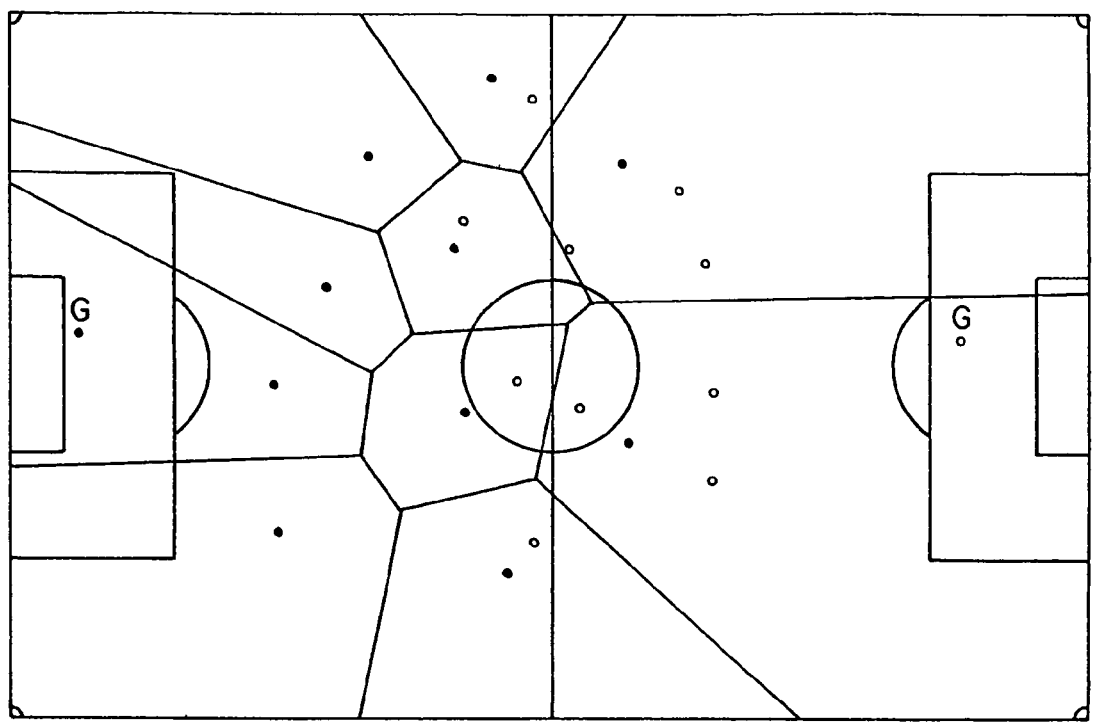
FIG. 5(a) illustrates a Voronoi diagram for a first team without its goalie.
Figure 5B:
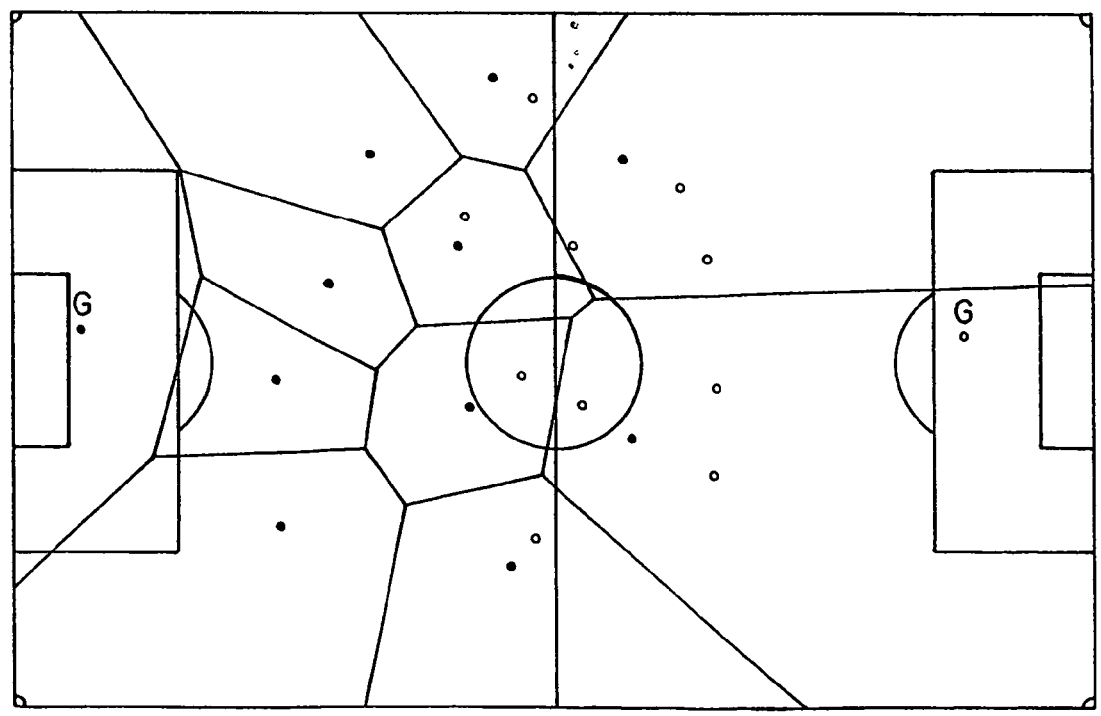
FIG. 5(b) illustrates a Voronoi diagram for the first team with its goalie.
Figure 5C:
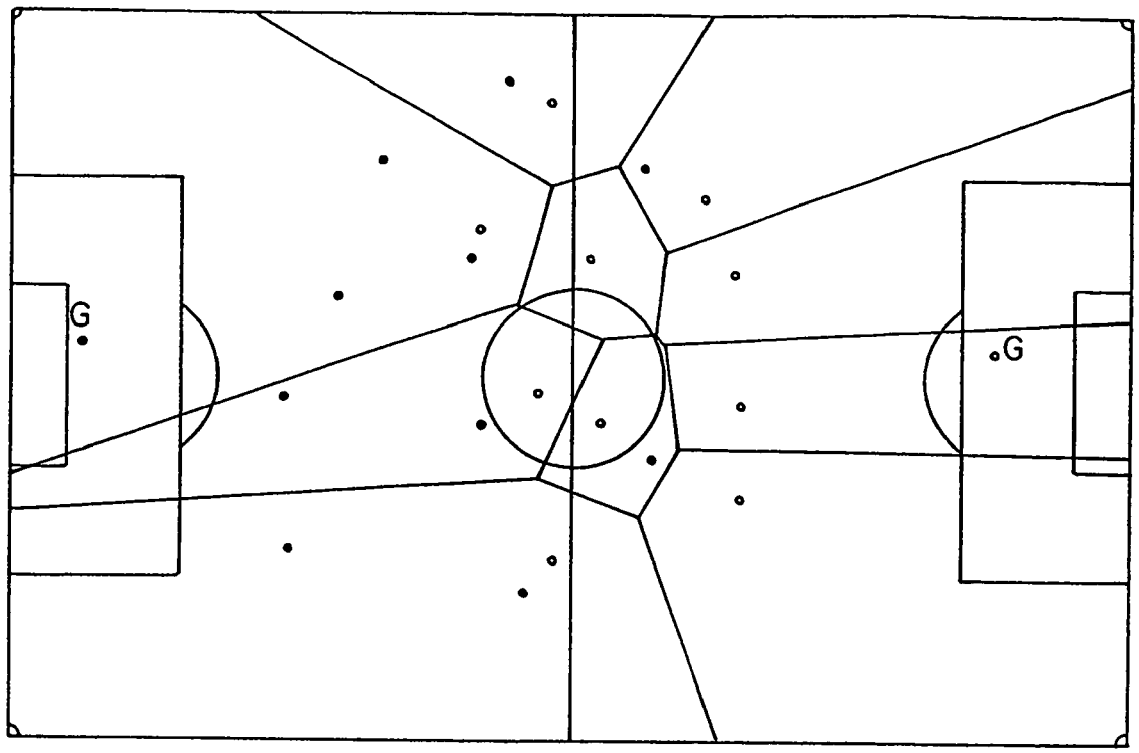
FIG. 5(c) illustrates a Voronoi diagram for a second team without its goalie.
Figure 5D:
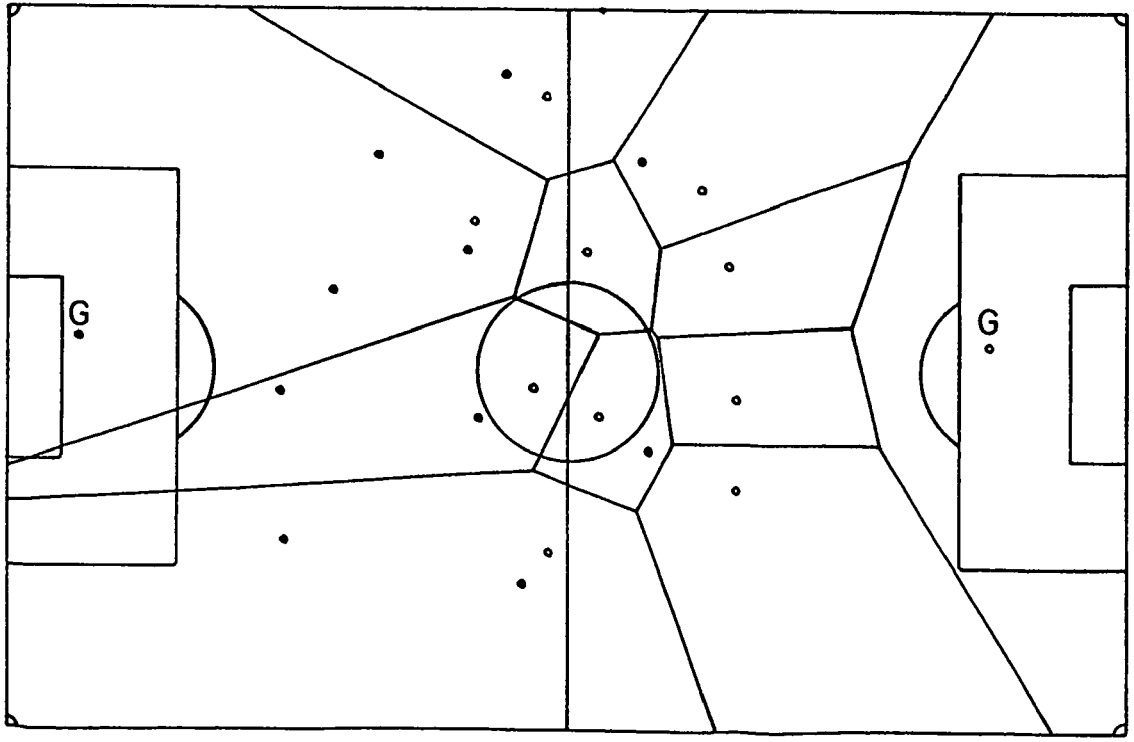
FIG. 5(d) illustrates a Voronoi diagram for the second team with its goalie.
Figure 5E:
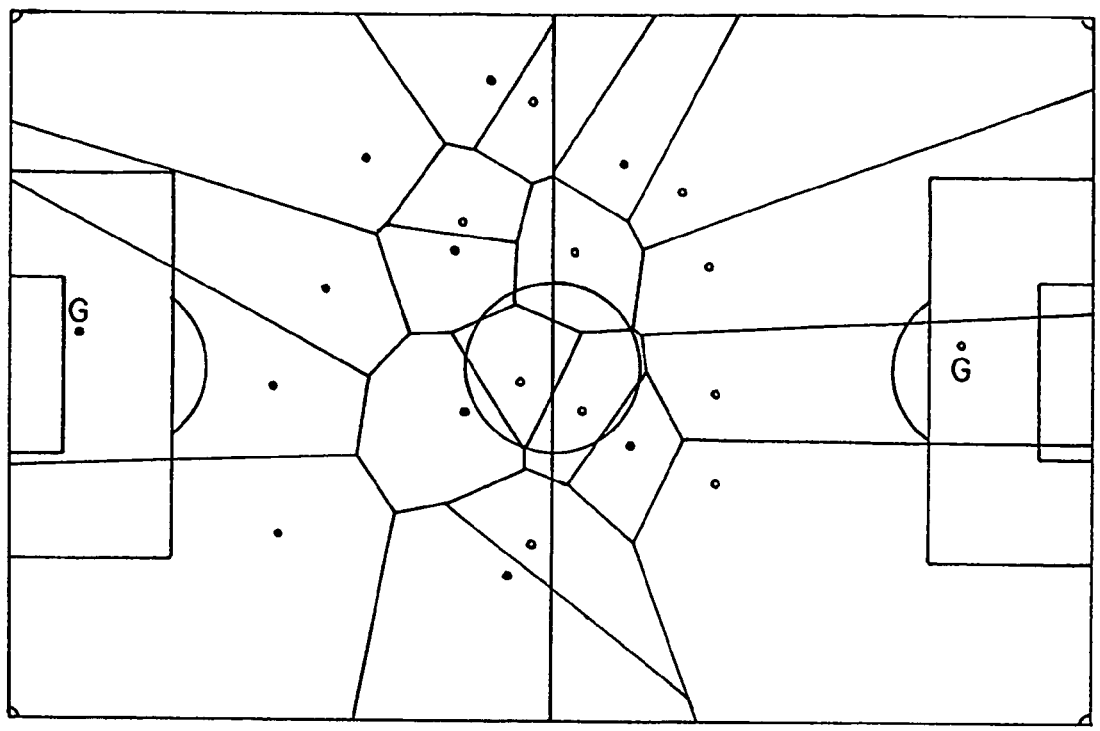
FIG. 5(e) illustrates a Voronoi diagram for both teams without their goalies.
Figure 5F:
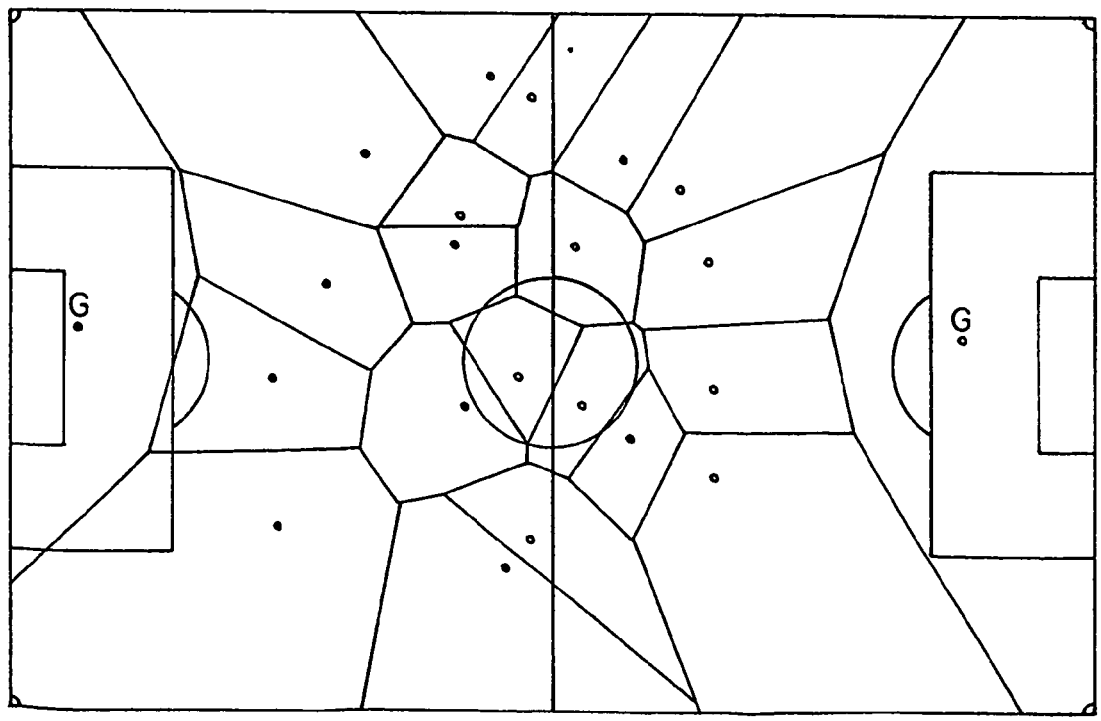
FIG. 5(f) illustrates a Voronoi diagram for both teams with their goalies.

In a specific embodiment, tactical analysis uses six different Voronoi diagrams, as illustrated in FIG. 5. Where the two teams are labelled "Team A" (shown by filled-in squares) and "Team B" (shown by open circles), the six diagrams (and the shorthand used below) are:

FIG. 5(a)—Team A without its goalie (VD-A)
FIG. 5(b)—Team A with its goalie (VD-Ag)
FIG. 5(c)—Team B without its goalie (VD-B)
FIG. 5(d)—Team B with its goalie (VD-Bg)
FIG. 5(e)—Both teams without their goalies (VD-AB)
FIG. 5(f)—Both teams with their goalies (VD-ABg)

These diagrams can be computed using an incremental algorithm, such as the incremental algorithm described by Fortune, S. J., "A Sweepline Algorithm for Voronoi Diagrams", *Algorithmica*, 2:153-174 (1987). In a modification for a soccer game, the standard incremental algorithm is used on the first pass and then throughout the rest of the game, the initial guess used to initialize the incremental algorithm is based on the previous Voronoi diagram. This is useful in other applications similar to a soccer game, where the sites are expected to move only a small amount each time the diagram is calculated.

In addition, the work of calculating the diagrams can be split up over three frames, with the home team's diagram being calculated in the first frame, the away team's diagram being calculated in the second frame, and the diagram for both teams being calculated in the third frame, based on the previous two calculations for improved efficiency. The current position of a player can be used as a site for the Voronoi division, but a forecasted future position of the player might be used instead, where the forecast is based on the player's current position and current momentum (or speed, velocity, etc.). In one example, just using player positions will fail to account for the fact that it is easier for a player to reach points in front of the player than behind the player. By offsetting the player's position forward a bit, in the direction of motion, and in proportion to the player's speed, a closer approximation of the diagram is possible, using a standard linear metric than using a metric that takes into account momentum and turning. Also, the latter would be prohibitively expensive to compute.

Spatial and Tactical Analysis

Several examples of spatial analysis that might be used as the basis of tactical analysis that use the results of Voronoi division (i.e., use the Voronoi diagram or a representation of the Voronoi diagram) will now be described. In these examples, the field is a soccer field and the two teams are Team A and Team B. Depending on implementation, either team can be a computer-controlled team while the other team is a human user-controlled team. Alternatively, both teams can be human user-controlled teams or both teams can be computer-controlled teams. A typical computer game might include a tactical engine that can generate decisions on strategy for a computer-controlled team and/or for a human user-controlled team. In the latter case, the decisions might be part of a learning mode or an assisting mode and might be turned off in a competitive mode where the human user wants to make all of the strategy decisions without assistance.

Player positioning is one analysis that might be done in a game. Player positioning analysis is usable to determine how to move or reposition a player. For example, various Voronoi diagrams might be examined to identify a player closest to the ball and teammates and/or opponents that are the player "nearest neighbors". From lines drawn from player O to neighbors, passing lanes can be determined and then another Voronoi diagram might be used to calculate which teammates are closest to these passing lanes. Based on that information, teammates move towards these lines to position themselves for a pass. Player positioning and other strategies might be informed by the team formations adopted by an opponent, such as 4-4-2 or 3-5-2 formations.

Figure 6A:
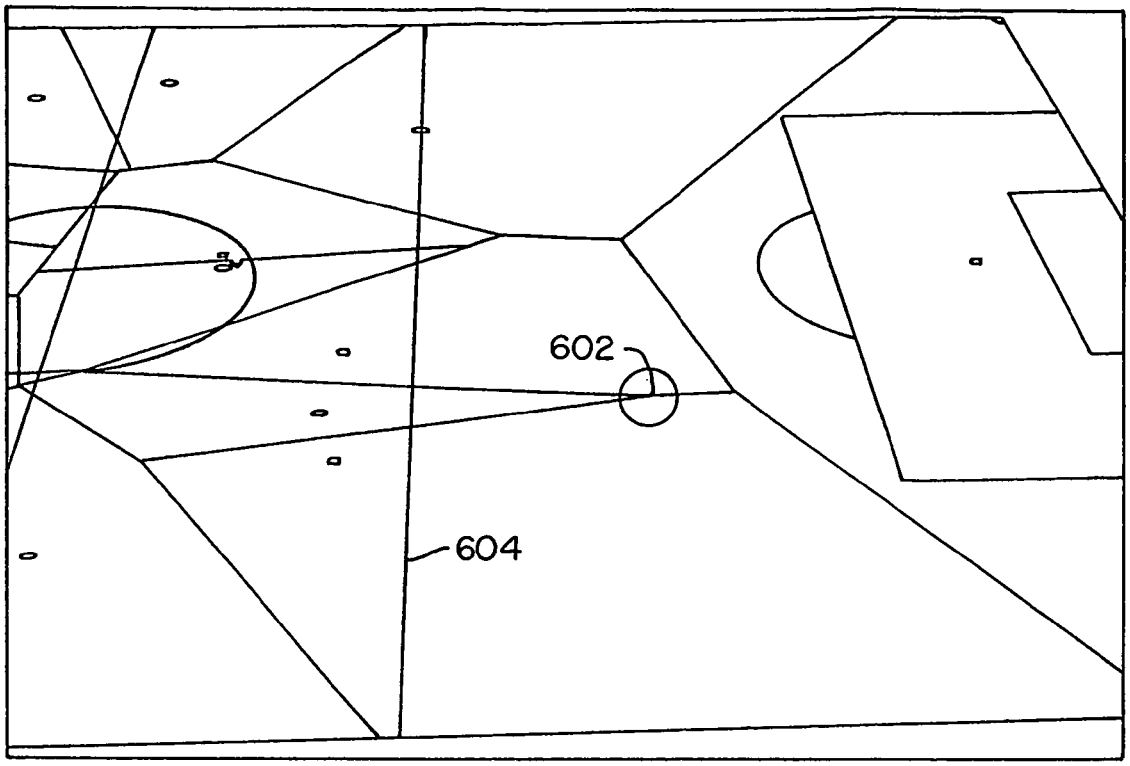
FIG. 6(a) is a perspective view of a field divided by a Voronoi diagram usable to determine a run to beat on offside line.

Offensive runs are calculated using VD-AB (or sometimes VD-ABg). This example is illustrated by FIG. 6(a). If any player on the attacking team (Team A) has a Voronoi vertex on VD-AB that is closer to Team B's net than the offside line, then that player makes an offensive through run to that vertex (vertex 602 in the figure). This models a player's behavior when the player realizes that he/she can get to that piece of space before anyone else on the field. Since this point is beyond the offside line (line 604 in the figure), a run could result in a breakaway. Care should be taken in using the most appropriate Voronoi diagram, which should be apparent from this description. For example, if VD-AB is used for an offensive run in an area of the field where a goalie is likely to be present, the ball might be passed to, or near, the opposing goalie, whereas if VD-ABg were used, the positions of the goalies would be taken into account.

In addition to offensive run determination, the process described above for offensive runs can be used by the defense to identify holes in their defensive positioning, and adjust accordingly.

Dribbling the ball with collision avoidance is another tactical analysis. With this analysis, to have a player with the ball to dribble to a target point on the field, the player should dribble towards the Voronoi vertex from VD-AB that is closest to the target point. The resulting behavior causes the player to arrive at the point quickly, while avoiding teammates and opponents, moving in a manner that looks very much like a soccer player, including feints and abrupt heading changes when appropriate.

Figure 6B:
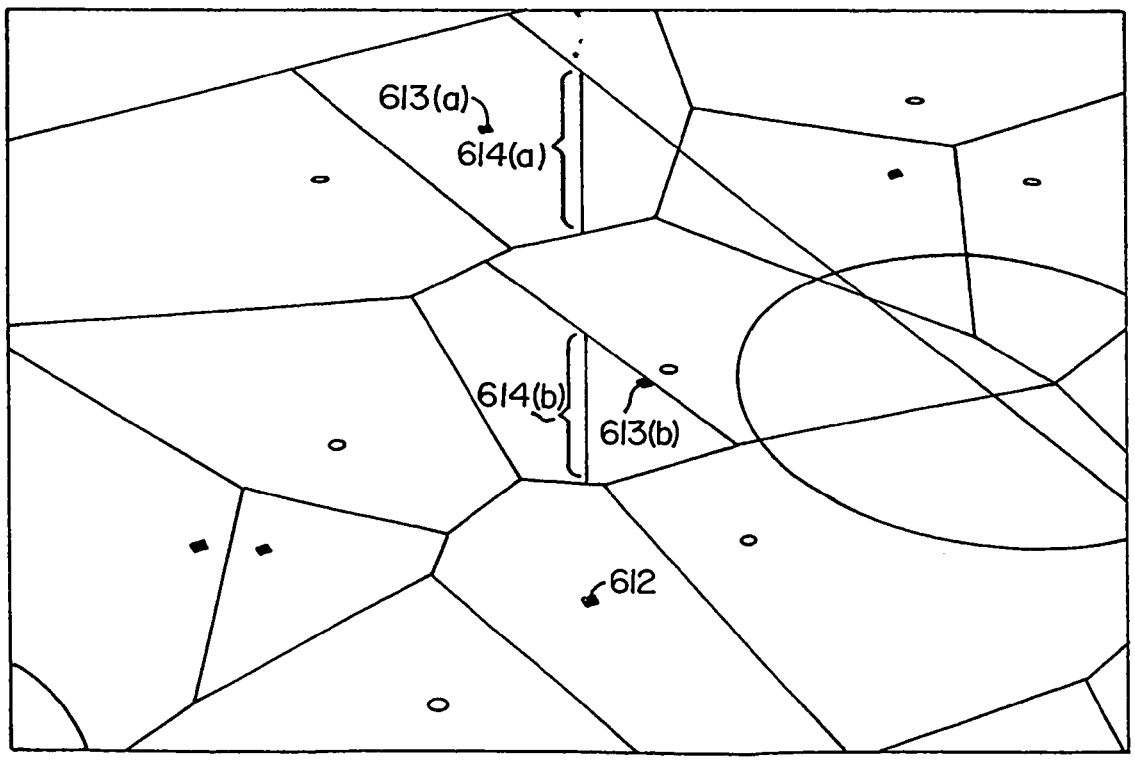
FIG. 6(b) is a perspective view of a field divided by a Voronoi diagram usable to determine passing regions.

Ball passing determinations might use VD-ABg to determine where best to pass the ball to a teammate. The goal of the analysis is to pass the ball to a point inside the current ballholder's (call it "player BH") Voronoi cell in VD-ABg. This is illustrated by FIG. 6(b), wherein a passer 612 considers a pass to a teammate 613. As shown, there are two players that might be suitable receivers. Other diagrams can be used, such as VD-AB, but if the goalies are not taken into account, the ball might get passed such that the opposing goalie can reach the ball first, which is normally undesirable.

Several techniques can be used to determine the target point to where the ball will be passed. In one technique, the computer intersects BH's facing vector and the Voronoi cell of receiver(s) to get a range of possible reception points along that line of intersection. Those points are the points along intersection line segments 614 in FIG. 6(b), where intersection line segment 614(a) is the set of points where receiver 613(a) would receive the pass and can reach before any other player and intersection line segment 614(b) is the set of points where receiver 613(b) would receive the pass and can reach before any other player. The direction of the intersection line segments from the passer can be the direction of the movement vector of the receiver, or another direction selected by the computer or the user. Also, the analysis could look for the points within a Voronoi cell of a receiver that leads the receiver the most, while still ensuring the receiver will get to the ball first. Taking into account the intersection line segments, a suggested power for a ball kick could be determined such that the ball reaches the receiver's Voronoi cell at the preferred or optimal time with a preferred or optimal speed.

The topology of the Voronoi diagrams, such as VD-B, can be used for tactical pattern matching. Other Voronoi diagrams might be saved and used to match features, depending on what patterns are to be identified. When a situation is identified in a soccer game, the topology of the Voronoi diagrams can be saved. This includes edge angles, edge lengths, Voronoi neighbors, and Voronoi cell areas. When the same topology is identified in a subsequent game, action can be taken based on pre-determined behavior that is appropriate to that specific situation. Thus, game states that are not identical can be analogized into similar game situations so that a relatively small number of pre-determined behaviors can be stored and used in response to a relatively large number of game states.

Figure 6C:
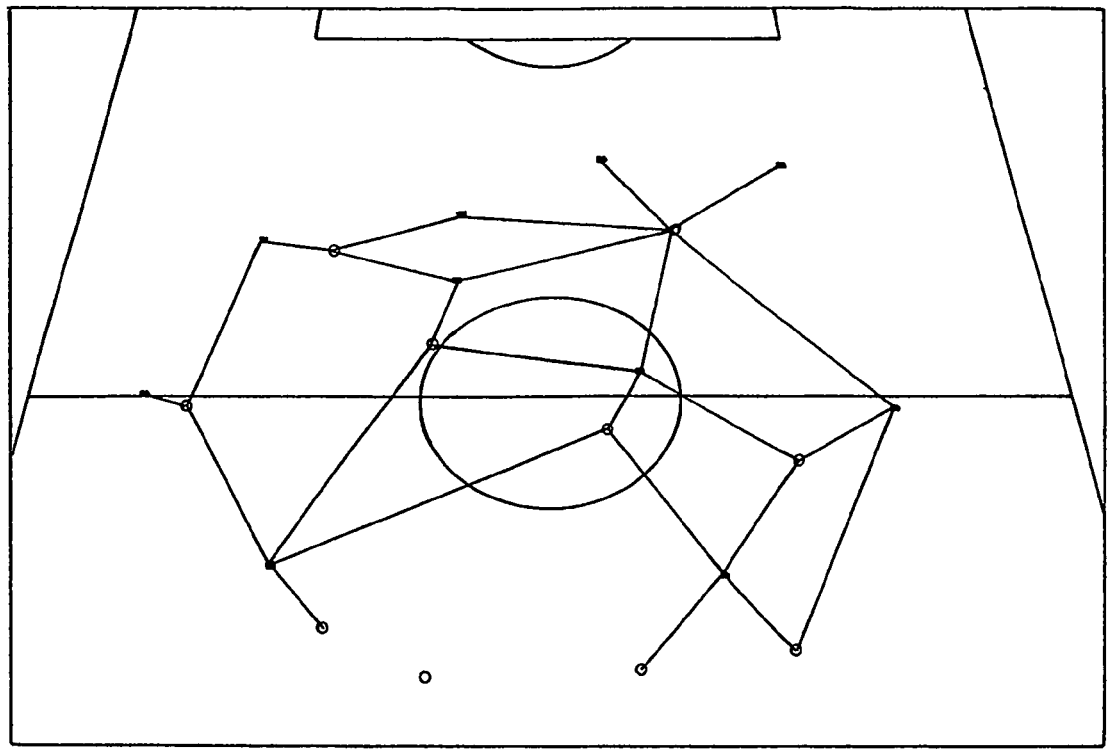
FIG. 6(c) is a Delaunay triangulation diagram of two teams usable for a marking analysis.
Figure 6D:
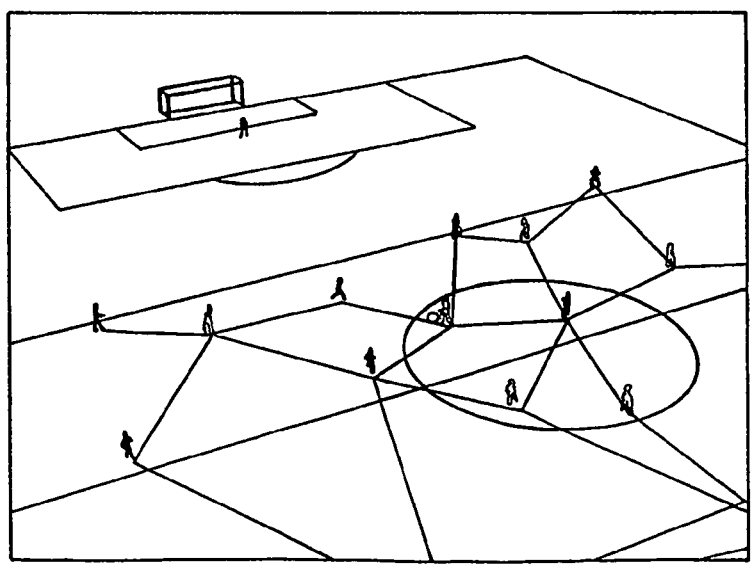
FIG. 6(d) is another Delaunay triangulation diagram of two teams, from a perspective view on a field display.

For "defensive marking logic", the Voronoi neighbors in VD-AB of a given player are used to determine potential opponents for that player to mark. "Marking" is the process of a defending player deciding which offensive player to cover. This is extremely effective, as it reduces the number of players that need to be considered in a marking algorithm. Alternatively, a Delaunay triangulation diagram can be used. A Delaunay triangulation diagram is the "dual" of the Voronoi diagram and comprises line segments drawn between pairs of Voronoi sites that are in cells that share an edge. An example of part of a Delaunay triangulation diagram is shown in FIG. 6(c). There, lines between teammates are eliminated (leaving only lines pairing up opponents that share Voronoi cell edges. Those lines represent good candidates for marking. In should be understood that a Delaunay triangulation diagram might be a suitable substitute for a Voronoi diagram in certain analyses. FIG. 6(d) is a perspective view of a soccer field representation, with a Delaunay triangulation diagram overlaid.

Other Voronoi diagrams can be used in analysis other than the basic six. For example, an analysis can be done wherein injured players (who might be injured, but who have not left the field), might be excluded from a diagram so that they are not considered. In other diagrams, team players from one team might be added to their opposing team, to obtain a slightly different Voronoi diagram. In yet other diagrams, the ball holder is moved into the opposing team's Voronoi diagram. It should be understood that, in the general case, a Voronoi diagram could be easily created for an analysis with an arbitrary set of players from one or both teams. While the game officials normally should not come into consideration, they might also be included where appropriate.

One or more of the Voronoi diagrams can be rendered on screen. Where CD-AB or VD-ABg are rendered, each team's cells might be colored differently. This would give human users insight into the space that his or her team owns, and gives a tactical advantage. A variation of this would be to render the Voronoi diagram only at the edges of the screen. This would give the user an idea of where off-screen players are located and the potential success made to a player who is off the screen.

Other uses of the Voronoi diagrams will be apparent upon review of this disclosure. For example, one or more of the Voronoi diagrams for the soccer game might be used any time the tactical engine needs to determine who "owns" a point on the field, and which players are close to other players. Ownership of a point is useful for passing and marking purposes, as it indicates who can get to that point first. "Marking" refers to a defending player deciding where to be or what opponent to cover. Yet other uses include evaluating "give and go" passes, runs, a new pass model and "through pass logic". By using the geometry of the Voronoi diagram, all of the points of the field can be assigned at once to allow tactical assessments of what to do more easily and exhaustively than if each point of interest had to be tested separately.

Where the Voronoi space is a baseball field, the corresponding tactical engine might need to determine who will be attempting to catch a fly ball, or the like. The above-described techniques might also be used for real-time strategy games where combat analysis and tactical planning could be done with similar techniques. Simulation games, where planning of optimal placement of resources (schools, fire stations, etc.) could use spatial analysis that includes some of the techniques described herein. In some games, such as real-time strategy games, the Voronoi cells might be defined by just players or actors in the game, but some diagrams might also include other objects, such as buildings, minefields, and other obstacles that can be generalized as objects to navigate toward or away from.

A system for analysis in a computer game, along with several variations has now been described. The use of Voronoi division allows for quick solutions to game strategic problems such as determining ownership of space and player proximities in an efficient and consistent manner. Where this information is calculated once and referenced throughout program code implementing a game, the efficiency and understandability of the tactical code is improved. In addition, these techniques allow for more realistic and dynamic behavior of a computer-controlled opponent. The methods described herein are extremely useful for visualizing, as well as implementing, new features in computer games.

The invention has now been described with reference to the preferred embodiments. Alternatives and substitutions will now be apparent to persons of skill in the art. Merely by way of example, the Voronoi divisions described above assumed that the division metric (i.e., the rule used to divide the space) was uniform and was a distance metric. However, the invention can also apply to Voronoi divisions wherein the space is divided by a function other than just distance to Voronoi sites or where the metrics used for different sites are different.

For example, instead of having a Voronoi edge between two sites being defined by the set of points that are equidistant from the two sites, the edge might be defined by the set of points where distance to one site is weighted more than distance to the other site or where the function that is equal at each of the points on the edge is not just a linear function of distance from the sites. Such a function might be useful in the context of a game where players are assigned different "strength" functions and those functions are used to perform the Voronoi division. Thus, players on a team can be assigned strength, agility, and speed attributes with Voronoi division being done accordingly. If effect, this might be a way for the computer analysis to do the same analysis that an actual soccer player might take into account in some situations, such as where a soccer player kicks the ball in one direction if the closest opponent is an average player but kicks the ball at a different angle that keeps the ball further away from the closest opponent when that opponent is identified as an above-average player.

As another example of a variation, many games might allow two human competitors to compete against each other, in which case the computer might not have to perform any analysis of a game. However, a game could perform the analysis anyway, to assist one player or both players. As yet another example, the computer games might be strategy games that are not sports-related, such as simulation games.

Accordingly, it is not intended to limit the invention except as provided by the appended claims.

What is claimed is:

1. A method performed by a gaming device of analyzing a game situation of a computer game, wherein the gaming device manages a representation of a game space and a plurality of game elements each having a position within the game space, the method comprising:
   dividing the game space, using the gaming device, into a plurality of cells having boundaries such that each cell is associated with a game element of the plurality of game elements and the boundary of each cell is such that points within that cell are closer to the position of the game element associated with that cell than the points are to the positions of game elements associated with other cells of the plurality of cells;
   determining, with the gaming device, a state for each of the plurality of game elements, wherein the state of each game element includes at least the game element's position in the representation of the game space formed by the plurality of cells;
   selecting, with the gaming devices a position in a cell in the plurality of cells, the selected position not including a position of any game elements;
   performing, with the gaming device, an analysis of the game situation based on the representation of the game space using a first game element's position in the representation of the game space in relation to the selected position in the cell; and
   performing an action, with the gaming device, that changes state of at least one game element in the plurality of game elements using the analysis of the game situation.

2. The method of claim 1, wherein performing the analysis comprises determining with the gaming device a future position for the first game element in the cell.

3. The method of claim 2, further comprising causing the first game element to move to the future position with the gaming device.

4. The method of claim 2, wherein the first game element comprises a computer controlled entity.

5. The method of claim 2, wherein the first game element comprises a game element that does not possess an object in the game situation.

6. The method of claim 5, wherein the first game element is on a same team as a second game element that possesses the object in the game situation.

7. The method of claim 6, wherein the second game element that possesses the object comprises a passer and the first game element comprises a receiver, wherein performing the analysis comprises determining with the gaming device an action to pass the object from the passer to the receiver at the future position.

8. The method of claim 6, wherein the second game element that possesses the object comprises a human controlled entity.

9. The method of claim 2, wherein the state of each game element comprises at least one of a momentum of the game element, a speed of the game element, the game element's direction of travel, and the game element's velocity.

10. The method of claim 9, wherein performing the analysis comprises using at least one of the momentum of the first game element, the speed of the first game element, the first game element's direction of travel, and the first game element's velocity to determine the future position with the gaming device.

11. The method of claim 1, wherein selecting the position in the cell comprises selecting the position in a cell that does not include a game element in the plurality of game elements.

12. The method of claim 1, wherein the first game element's position is a position closest to a second game element that possesses an object in the game situation, wherein performing the analysis comprises determining with the gaming device that the first game element is in the position closest to the second game element that possesses the object in the game situation.

13. The method of claim 1, wherein the plurality of game elements comprise soccer players and the game space represents a soccer field.

14. The method of claim 1, wherein the plurality of game elements comprise baseball players and the game space represents a baseball field.

15. The method of claim 1, wherein the plurality of game elements comprise basketball players and the game space represents a basketball court.

16. A method performed by a gaming device of analyzing a game situation of a computer game, wherein the gaming device manages a representation of a game space and a plurality of game elements each having a position within the game space, each of the plurality of game elements being associated with a team in a plurality of teams, the method comprising:

dividing the game space, using the gaming device, into a plurality of cells having boundaries such that each cell is associated with a game element of the plurality of game elements and the boundary of each cell is such that points within that cell are closer to the position of the game element associated with that cell than the points are to the positions of game elements associated with other cells of the plurality of cells;

determining, with the gaming device, a first game element in the plurality of game elements that possesses an object in the game space;

determining, with the gaming device, a second game element in the plurality of game elements on a same team as the first game element;

determining a state of the second game element, with the gaming device, wherein the state of the second game element includes at least the second game element's position in a cell in the plurality of cells;

performing, with the gaming device, an analysis of the game situation based on the representation of the game space using the position of the second game element in the cell; and performing an action, with the gaming device, that changes state of at least one game element in the plurality of game elements using the analysis of the game situation.

17. The method of claim 16, wherein the second game element's position comprises a position closest to the first game element based on position's of all game elements associated with the same team.

18. The method of claim 16, wherein the first player comprises a human-controlled player and the second player comprises a computer-controlled player.

19. The method of claim 16, wherein performing the analysis comprises determining with the gaming device an action for the second game element.

20. The method of claim 19, wherein determining the action comprises determining with the gaming device a future position for the second game element in the game space.

21. The method of claim 20, further comprising causing the second game element to move to the future position with the gaming device.

22. The method of claim 20, wherein the future position does not include a game element in the plurality of game elements.

23. The method of claim 20, wherein the state of the second game element comprises at least one of a momentum of the second game element, a speed of the second game element, the second game element's direction of travel, and the second game element's velocity.

24. The method of claim 23, wherein performing the analysis comprises using at least one of the momentum of the second game element, the speed of the second game element, the second game element's direction of travel, and the second game element's velocity to determine the future position with the gaming device.

25. The method of claim 16, wherein the first game element comprises a passer and the second game element comprises a receiver, wherein performing the analysis comprising determining with the gaming device an action to pass the object from the passer to the receiver at the future position.

26. The method of claim 16, wherein the plurality of game elements comprise soccer players and the game space represents a soccer field.

27. The method of claim 16, wherein the plurality of game elements comprise baseball players and the game space represents a baseball field.

28. The method of claim 16, wherein the plurality of game elements comprise basketball players and the game space represents a basketball court.

29. A method performed by a gaming device of analyzing a game situation of a computer game, wherein the gaming device manages a representation of a game space and a plurality of game elements each having a position within the game space, each of the plurality of game elements being associated with a team in a plurality of teams, the method comprising:

dividing the game space, with the gaming device, into a plurality of cells having boundaries such that each cell is associated with a game element of the plurality of game elements and the boundary of each cell is such that points within that cell are closer to the position of the game element associated with that cell than the points are to the positions of game elements associated with other cells of the plurality of cells;

selecting, with the gaming device, a position in a cell of the plurality of cells, the selected position not including a position of any game elements;

determining a state of a first game element, with the gaming device, wherein the state of the first game element includes at least the first game element's position in the representation of the game space;

determining, with the gaming device, that the first game element should be moved to the position not including any game elements based on an analysis of the game situation using the representation of the game space and the first game element's position; and performing an action based on the determination that the first game element should be moved to the position not including any game elements.

30. The method of claim 29, further comprising determining a second game element with the gaming device, the second game element possessing an object in the game situation.

31. The method of claim 30, further comprising causing the first game element to move to the position not including any game elements with the gaming device in response to the action.

32. The method of claim 30, wherein the first game element comprises a computer controlled entity and the second game element comprises a human controlled entity.

33. The method of claim 30, wherein the first game element and the second game element comprise computer controlled entities.

34. An apparatus for analyzing a game situation of a computer game, wherein the gaming device manages a representation of a game space and a plurality of game elements each having a position within the game space, the apparatus comprising:

a processor; and a memory coupled to the processor and configured to store processor-executable logic comprising:

logic configured to divide the game space, into a plurality of cells having boundaries such that each cell is associated with a game element of the plurality of game elements and the boundary of each cell is such that points within that cell are closer to the position of the game element associated with that cell than the points are to the positions of game elements associated with other cells of the plurality of cells;

logic configured to determine a state for each of the plurality of game elements, wherein the state of each game element includes at least the game element's position in the plurality of cells;

logic configured to select a position in a cell in the plurality of cells, the selected position not including a position of any game elements;

logic configured to perform an analysis of the game situation based on the representation of the game space using a first game element's position in the representation of the game space in relation to the selected position in the cell; and logic configured to perform an action that changes state of at least one game element in the plurality of game elements using the analysis of the game situation.

35. The apparatus of claim 34, wherein the logic configured to perform the analysis comprises logic configured to determining a future position for the first game element in the cell.

36. The apparatus of claim 35, further comprising logic configured to cause the first game element to move to the future position.

37. The apparatus of claim 35, wherein the first game element comprises a computer controlled entity.

38. The apparatus of claim 35, wherein the first game element comprises a game element that does not possess an object in the game situation.

39. The apparatus of claim 38, wherein the first game element is on a same team as a second game element that possesses the object in the game situation.

40. The apparatus of claim 39, wherein the second game element that possesses the object comprises a passer and the first game element comprises a receiver, wherein the logic configured to perform the analysis comprises logic configured to determine an action to pass the object from the passer to the receiver at the future position.

41. The apparatus of claim 39, wherein the second game element that possesses the object comprises a human controlled entity.

42. The apparatus of claim 35, wherein the state of each game element comprises at least one of a momentum of the game element, a speed of the game element, the game element's direction of travel, and the game element's velocity.

43. The apparatus of claim 42, wherein the logic configured to perform the analysis comprises logic configured to use at least one of the momentum of the first game element, the speed of the first game element, the first game element's direction of travel, and the first game element's velocity to determine the future position.

44. The apparatus of claim 34, wherein the logic configured to select the position in a cell comprises logic configured to select a cell that does not include a game element in the plurality of game elements.

45. The apparatus of claim 34, wherein the first game element's position comprises a position closest to a second game element that possesses an object in the game situation, wherein the logic configured to perform the analysis comprises logic configured to determine that the first game element is in the position closest to the second game element that possesses the object in the game situation.

46. The apparatus of claim 34, wherein the plurality of game elements comprise soccer players and the game space represents a soccer field.

47. The apparatus of claim 34, wherein the plurality of game elements comprise baseball players and the game space represents a baseball field.

48. The apparatus of claim 34, wherein the plurality of game elements comprise basketball players and the game space represents a basketball court.

49. An apparatus for analyzing a game situation of a computer game, wherein the gaming device manages a representation of a game space and a plurality of game elements each having a position within the game space, each of the plurality of game elements being associated with a team in a plurality of teams, the apparatus comprising:

a processor; and a memory coupled to the processor and configured to store processor-executable logic comprising:

logic configured to divide the game space, into a plurality of cells having boundaries such that each cell is associated with a game element of the plurality of game elements and the boundary of each cell is such that points within that cell are closer to the position of the game element associated with that cell than the points are to the positions of game elements associated with other cells of the plurality of cells;

logic configured to determine a first game element in the plurality of game elements that possesses an object in the game space;

logic configured to determine a second game element in the plurality of game elements on a same team as the first game element;

logic configured to determine a state of the second game element, wherein the state of the second game element includes at least the second game element's position in a cell in the plurality of cells;

logic configured to perform an analysis of the game situation based on the representation of the game space using the position of the second game element; and logic configured to perform an action that changes state of at least one game element in the plurality of game elements using the analysis of the game situation.

50. The apparatus of claim 49, wherein the second game element's position comprises a position closest to the first game element based on position's of all game elements associated with the same team.

51. The apparatus of claim 49, wherein the first player comprises a human-controlled player and the second player comprises a computer-controlled player.

52. The apparatus of claim 49, wherein the logic configured to perform the analysis comprises logic configured to determine an action for the second game element.

53. The apparatus of claim 52, wherein the logic configured to determine the action comprises logic configured to determine a future position for the second game element in the game space.

54. The apparatus of claim 53, further comprising logic configured to cause the second game element to move to the future position.

55. The apparatus of claim 53, wherein the future position does not include a game element in the plurality of game elements.

56. The apparatus of claim 53, wherein the state of the second game element comprises at least one of a momentum of the second game element, a speed of the second game element, the second game element's direction of travel, and the second game element's velocity.

57. The apparatus of claim 56, wherein the logic configured to perform the analysis comprises logic configured to use at least one of the momentum of the second game element, the speed of the second game element, the second game element's direction of travel, and the second game element's velocity to determine the future position.

58. The apparatus of claim 49, wherein the first game element comprises a passer and the second game element comprises a receiver, wherein the logic configured to perform the analysis comprises logic configured to determine an action to pass the object from the passer to the receiver at the future position.

59. The apparatus of claim 49, wherein the plurality of game elements comprise soccer players and the game space represents a soccer field.

60. The apparatus of claim 49, wherein the plurality of game elements comprise baseball players and the game space represents a baseball field.

61. The apparatus of claim 49, wherein the plurality of game elements comprise basketball players and the game space represents a basketball court.

62. An apparatus for analyzing a game situation of a computer game, wherein the gaming device manages a representation of a game space and a plurality of game elements each having a position within the game space, each of the plurality of game elements being associated with a team in a plurality of teams, the apparatus comprising:
  a processor; and
  a memory coupled to the processor and configured to store processor-executable logic comprising:
    logic configured to divide the game space into a plurality of cells having boundaries such that game elements are positioned in cells in the plurality of cells and each cell is associated with a game element of the plurality of game elements and the boundary of each cell is such that points within that cell are closer to the position of the game element associated with that cell than the points are to the positions of game elements associated with other cells of the plurality of cells;
    logic configured to select a position in a cell of the plurality of cells, the selected position not including a position of any game elements;
    logic configured to determine a state of a first game element, wherein the state of the first game element includes at least the first game element's position in the representation of the game space;
    logic configured to determine that the first game element should be moved to the position not including any game elements based on an analysis of the representation of the game space and the first game element's position; and
    logic configured to perform an action based on the determination that the first game element should be moved to the position not including any game elements.

63. The apparatus of claim 62, further comprising logic configured to determine a second game element, the second game element possessing an object in the game situation.

64. The apparatus of claim 63, further comprising logic configured to cause the first game element to move to the position not including any game elements in response to the action.

65. The apparatus of claim 62, wherein the first game element comprises a computer controlled entity and the second game element comprises a human controlled entity.

66. The apparatus of claim 62, wherein the first game element and the second game element comprise computer controlled entities.

67. A computer program product stored on a computer-readable storage medium for analyzing a game situation of a computer game, wherein the gaming device manages a representation of a game space and a plurality of game elements each having a position within the game space, the computer program product comprising:
  code for dividing the game space into a plurality of cells having boundaries such that each cell is associated with a game element of the plurality of game elements and the boundary of each cell is such that points within that cell are closer to the position of the game element associated with that cell than the points are to the positions of game elements associated with other cells of the plurality of cells;
  code for determining a state for each of the plurality of game elements wherein the state of each game element associated with the computer game includes at least the game element's position in the plurality of cells;
  code for selecting a position in a cell in the plurality of cells, the selected position not including a position of any game elements;
  code for performing an analysis of the game situation based on the representation of the game space using a first game element's position in the representation of the game space in relation to the selected position in the cell; and
  code for performing an action that changes state of at least one game element in the plurality of game elements using the analysis of the game situation.

68. The computer program product of claim 67, wherein the code for performing the analysis comprises code for determining a future position for the first game element in the cell.

69. The computer program product of claim 68, further comprising code for causing the first game element to move to the future position.

70. The computer program product of claim 68, wherein the first game element comprises a computer controlled entity.

71. The computer program product of claim 68, wherein the first game element comprises a game element that does not possess an object in the game situation.

72. The computer program product of claim 71, wherein the first game element is on a same team as a second game element that possesses the object in the game situation.

73. The computer program product of claim 72, wherein the second game element that possesses the object comprises a passer and the first game element comprises a receiver, wherein the code for performing the analysis comprises code for determining an action to pass the object from the passer to the receiver at the future position.

74. The computer program product of claim 72, wherein the second game element that possesses the object comprises a human controlled entity.

75. The computer program product of claim 68, wherein the state of each game element comprises at least one of a momentum of the game element, a speed of the game element, the game element's direction of travel, and the game element's velocity.

76. The computer program product of claim 75, wherein the code for performing the analysis comprises using at least one of the momentum of the first game element, the speed of the first game element, the first game element's direction of travel, and the first game element's velocity to determine the future position.

77. The computer program product of claim 67, wherein the code for selecting the position in the cell comprises code for selecting a cell that does not include a game element in the plurality of game elements.

78. The computer program product of claim 67, wherein the first game element's position comprises a position closest to a second game element that possesses an object in the game situation, wherein the code for performing the analysis comprises code for determining that the game element is in the position closest to the game element that possesses the object in the game situation.

79. The computer program product of claim 67, wherein the plurality of game elements comprise soccer players and the game space represents a soccer field.

80. The computer program product of claim 67, wherein the plurality of game elements comprise baseball players and the game space represents a baseball field.

81. The computer program product of claim 67, wherein the plurality of game elements comprise basketball players and the game space represents a basketball court.

82. A computer program product stored on a computer-readable storage medium for analyzing a game situation of a computer game, wherein the gaming device manages a representation of a game space and a plurality of game elements each having a position within the game space, each of a plurality of game elements being associated with a team in a plurality of teams, the computer program product comprising:
   code for dividing the game space into a plurality of cells having boundaries such that each cell is associated with a game element of the plurality of game elements and the boundary of each cell is such that points within that cell are closer to the position of the game element associated with that cell than the points are to the positions of game elements associated with other cells of the plurality of cells;
   code for determining a first game element in the plurality of game elements that possesses an object in the game space;
   code for determining a second game element in the plurality of game elements on a same team as the first game element;
   code for determining a state of the second game element, wherein the state of the second game element includes at least the second game element's position in a cell in the plurality of cells;
   code for performing an analysis of the game situation based on the representation of the game space using the position of the second game element; and
   code for performing an action that changes state of at least one game element in the plurality of game elements using the analysis of the game situation.

83. The computer program product of claim 82, wherein the second game element's position comprises a position closest to the first game element based on position's of all game elements associated with the same team.

84. The computer program product of claim 82, wherein the first player comprises a human-controlled player and the second player comprises a computer-controlled player.

85. The computer program product of claim 82, wherein the code for performing the analysis comprises code for determining an action for the second game element.

86. The computer program product of claim 85, wherein the code for determining the action comprises code for determining a future position for the second game element in the game space.

87. The computer program product of claim 86, further comprising code for causing the second game element to move to the future position.

88. The computer program product of claim 86, wherein the future position does not include a game element in the plurality of game elements.

89. The computer program product of claim 86, wherein the state of the second game element comprises at least one of a momentum of the second game element, a speed of the second game element, the second game element's direction of travel, and the second game element's velocity.

90. The computer program product of claim 89, wherein the code for performing the analysis comprises code for using at least one of the momentum of the second game element, the speed of the second game element, the second game element's direction of travel, and the second game element's velocity to determine the future position.

91. The computer program product of claim 82, wherein the first game element comprises a passer and the second game element comprises a receiver, wherein the code for performing the analysis comprising code for determining an action to pass the object from the passer to the receiver at the future position.

92. The computer program product of claim 82, wherein the plurality of game elements comprise soccer players and the game space represents a soccer field.

93. The computer program product of claim 82, wherein the plurality of game elements comprise baseball players and the game space represents a baseball field.

94. The computer program product of claim 82, wherein the plurality of game elements comprise basketball players and the game space represents a basketball court.

95. A computer program product stored on a computer-readable storage medium for analyzing a game situation of a computer game, wherein the gaming device manages a representation of a game space and a plurality of game elements each having a position within the game space, each of a plurality of game elements being associated with a team in a plurality of teams, the computer program product comprising:
   code for dividing the game space into a plurality of cells having boundaries such that each cell is associated with a game element of the plurality of game elements and the boundary of each cell is such that points within that cell are closer to the position of the game element associated with that cell than the points are to the positions of game elements associated with other cells of the plurality of cells, wherein the plurality of game elements are positioned in cells in the plurality of cells;
   code for selecting a position in a cell of the plurality of cells, the selected position not including a position of any game elements;
   code for determining a state of a first game element, wherein the state of the first game element includes at least the first game element's position in the representation of the game space;
   code for determining that the first game element should be moved to the position not including any game elements based on an analysis of the game situation using the representation of the game space and the first game element's position; and
   code for performing an action based on the determination that the first game element should be moved to the position not including any game elements.

96. The computer program product of claim 95, further comprising code for determining a second game element, the second game element possessing an object in the game situation.

97. The computer program product of claim 96, further comprising code for causing the first game element to move to the position not including any game elements.

98. The computer program product of claim 96, wherein the first game element comprises a computer controlled entity and the second game element comprises a human controlled entity.

99. The computer program product of claim 96, wherein the first game element and the second game element comprise computer controlled entities.

\* \* \* \* \*

UNITED STATES PATENT AND TRADEMARK OFFICE
CERTIFICATE OF CORRECTION

PATENT NO. : 7,588,493 B2  Page 1 of 1
APPLICATION NO. : 10/491585
DATED : September 15, 2009
INVENTOR(S) : Rupert et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1236 days.

Signed and Sealed this

Twenty-first Day of September, 2010

David J. Kappos
*Director of the United States Patent and Trademark Office*